Sept. 25, 1945.  W. R. McLAIN ET AL  2,385,636
PROCESS OF DISTRIBUTING INSECTICIDES
Filed Nov. 11, 1943
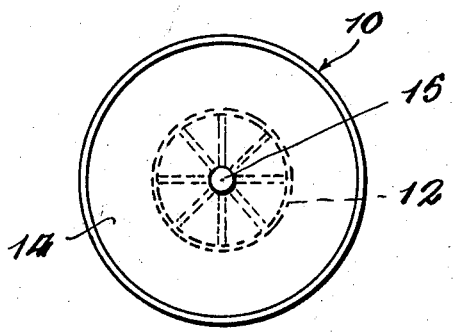
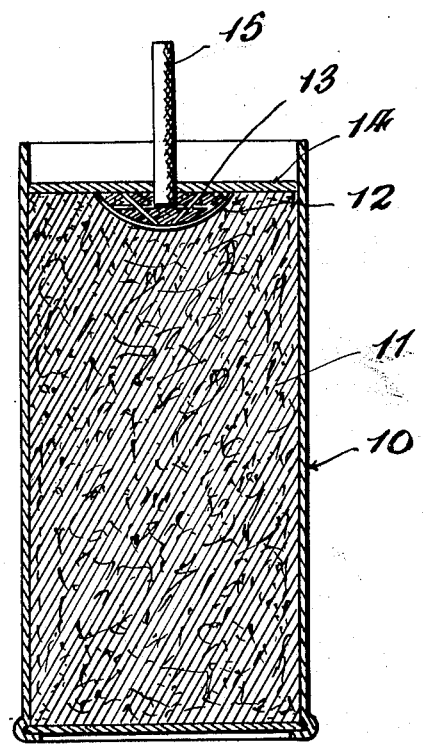
Inventors
William R. McLain,
Frank V. Miller
Edwin H. Green,
By Christian R. Nielsen.
Attorney Patented Sept. 25, 1945 2,385,636

UNITED STATES PATENT OFFICE 2,385,636

PROCESS OF DISTRIBUTING INSECTICIDES

William R. McLain, Frank V. Miller, and Edwin H. Green, Huntsville, Ala.

Application November 11, 1943, Serial No. 509,914

1 Claim. (Cl. 167—40)

This invention relates to a process for distributing insecticides.

It is a cardinal object of the invention to provide a process in which insecticides may be uniformly distributed over large areas of growing crops in a manner so as to insure distribution of the insecticides over the entire surface of the plants, rather than only upon the upper surfaces of the plants.

It is also an object of the invention to provide a process in which the same container used in marketing the product may also be used in applying or distributing the insecticide, thus avoiding the need of actual contact with the concentrated insecticide, by the user.

More specifically, it is an object of the invention to provide a process of distributing insecticides in the form of a smoke or vapor by means of sublimation or vaporization of the insecticide by using the heat of a chemical reaction.

Additional objects, advantages and features of invention will be apparent from the following description and accompanying drawing, wherein Figure 1 is a vertical section of a subliming or vaporizing unit.

Figure 2 is a top plan view of the unit.

Referring to the drawing, there is illustrated a container 10 of any suitable construction, in which there is deposited and pressed a mixture of insecticide and fuel 11. The containers will vary in size to meet commercial requirements and in an upper portion of the mixture 11 an open-work receptacle 12 is positioned, the latter functioning for retention of a suitable fast burning mixture of chemicals indicated at 13. The receptacle may be closed by a suitable fusible coating 14 into which a fuse 15 is embedded, the lower end of which is deposited in the chemical 13.

Obviously there are many combinations of chemicals which may be employed in producing a fast burning mixture for initiating the chemical reaction in the main chemical mixture of insecticide and fuel, and one example has been employed which consists of a mixture of potassium chlorate ($KClO_3$) and sulphur (S). The mixture contained 70% potassium chlorate and 30% of sulphur, and the reaction involved in the burning thereof is $2KClO_3+3S=2KCl+3SO_2$.

In accordance with our process, an insecticide has been formed with a mixture of arsenous oxide and powdered aluminum metal, in the following proportions:

| | Per cent |
|---|---|
| Arsenous oxide ($AS_2O_3$) | 80 |
| Powdered aluminum metal | 20 |

The chemical reactions involved under burning are:

$$As_2O_3+2Al=Al_2O_3+2As$$
$$4As+3O_2=2As_2O_3$$

In this particular mixture the reaction is of a thermite type in which pure arsenic is the product, and when the latter comes in contact with air, is oxidized to arsenic trioxide, which functions as the insecticide.

Also, a mixture of arsenic trioxide ($As_2O_3$) 46% and hexachlorethane ($C_2Cl_6$) 46% and powdered aluminum 8% produces an insecticide from a double decomposition type of reaction, in which sufficient heat is evolved to sublime or vaporize the arsenic trichloride, the latter being the insecticide. The reaction is as follows:

$$C_2Cl_6+As_2O_3=CO+CO_2+2AsCl_3$$

A further form of insecticide may be provided in a mixture of arsenic trioxide, 70%, potassium chlorate 22% and sulphur 8%. The reaction is as follows:

$$2KClO_3+3S=3SO_2+2KCl$$

In this reaction, the potassium chlorate and sulphur form a fuel mixture and provides ample heat during their reaction to sublime the arsenic trioxide so that it passes off into the air as a smoke and acts as the insecticide.

In use, the unit or units containing the insecticide is placed at suitable locations in an area to be treated. The fuse 15 is ignited which in turn effects combustion of the fuel mixture 13. The heat of combustion of the fuel 13 initiates a chemical reaction in the insecticide chemicals 11, which produces sufficient heat to sublime or vaporize the insecticide from chemicals 11, thus producing a vapor cloud or smoke which is distributed to the vegetation.

While we have shown and described a specific construction of unit and processes, this is by way of illustration only, and we consider as our own all such modifications of the unit and processes as fairly fall within the scope of the appended claim.

We claim:

A process of producing and vaporizing or subliming arsenous oxide by igniting a mixture of fast-burning chemicals, which in turn initiates a reaction between arsenous oxide and powdered aluminum which comprise the main chemical charge and thus producing arsenic which is sublimed or vaporized by heat of the same reaction, and is oxidized to arsenous oxide upon contact with the air and thus acts as an insecticide.

WILLIAM R. McLAIN.
FRANK V. MILLER.
EDWIN H. GREEN.